United States Patent [19]

Matsushita

[11] Patent Number: 5,121,093
[45] Date of Patent: Jun. 9, 1992

[54] ELECTROMAGNETIC COIL ASSEMBLY FOR AN ELECTROMAGNETIC CLUTCH

[75] Inventor: Takashi Matsushita, Isesaki, Japan

[73] Assignee: Sanden Corporation, Japan

[21] Appl. No.: 597,028

[22] Filed: Oct. 15, 1990

[30] Foreign Application Priority Data

Oct. 13, 1989 [JP] Japan .............................. 1-119152[U]

[51] Int. Cl.⁵ ...................... F16D 19/00; F16D 27/00; F16D 37/02
[52] U.S. Cl. .................................... 335/296; 335/297; 192/84 C
[58] Field of Search .......................... 192/84 C, 84 R; 335/288, 289, 296, 297, 299, 298

[56] References Cited

U.S. PATENT DOCUMENTS 3,016,118  1/1962  Zatsky .
3,036,679  5/1962  Millington et al. .
3,565,223  2/1971  Pierce .
3,833,871  9/1974  Fischer et al. ...................... 335/282
4,432,446  2/1984  Okano ................................. 335/289
4,547,757  10/1985  Yamada ............................... 335/296

FOREIGN PATENT DOCUMENTS 1119006  7/1968  United Kingdom .

Primary Examiner—Leo P. Picard
Assistant Examiner—Ramon M. Barrera
Attorney, Agent, or Firm—Banner, Birch, McKie & Beckett

[57] ABSTRACT

An electromagnetic clutch is disclosed which includes an electromagnetic coil assembly comprising an annular magnetic housing having a U-shaped cross section in order to contain an annular electromagnetic coil, an annular supporting plate on which a bottom end portion of a rubber member annular magnetic housing is firmly disposed, and a rubber grommet having an annular groove. The annular magnetic housing comprises a first hole formed at a bottom portion thereof. The annular supporting plate comprises a second hole concentric with the first hole. The diameter of the first hole is greater than the diameter of the second hole, thereby forming a annular projection at the bottom end surface of the annular magnetic housing. The annular projection is snugly engages the annular groove of the grommet so that the grommet is used as an insulator, a plug which can block the first hole of the annular magnetic housing, and a holder which can firmly hold a wire leading from the electromagnetic coil.

3 Claims, 5 Drawing Sheets

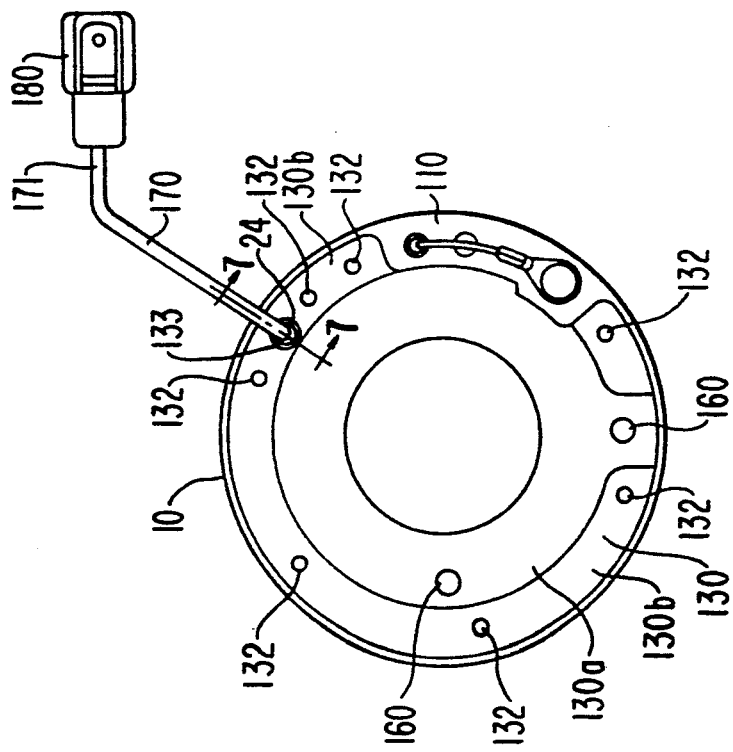

ELECTROMAGNETIC COIL ASSEMBLY FOR AN ELECTROMAGNETIC CLUTCH

BACKGROUND OF THE INVENTION

1. Field of the Invention

This invention generally relates to an electromagnetic clutch, such as for use in controlling the transmission of power from an automobile engine to a refrigerant compressor in an automobile air conditioning system, and more particularly, to the structure of an electromagnetic coil assembly of the electromagnetic clutch.

2. Description of The Prior Art

An electromagnetic clutch for use in controlling the transmission of power from an automobile engine to a refrigerant compressor in an automobile air conditioning system is illustrated in U.S. Pat. No. 4,799,578 to Matsushita. As illustrated in 578' Patent, the electromagnetic clutch includes an electromagnetic coil assembly comprising an annular magnetic housing having a U-shaped cross section in order to contain an annular electromagnetic coil which supplies magnetic flux for attracting an armature plate to an axial end plate portion of a rotor, and an annular supporting plate on which the annular magnetic housing is firmly fixed by, for example, spot welding. The annular supporting plate is firmly secured to the axial end surface of compressor housing by a plurality of rivets.

The electromagnetic coil is intermittently activated in response to automobile air conditioning demand, thereby intermittently supplying the magnetic flux for intermittently attracting the armature plate to the axial end plate portion of the rotor. Accordingly, power of the automobile engine is intermittently transmitted to the refrigerant compressor through the electromagnetic clutch in response to automobile air conditioning demand.

In order to generate the magnetic flux, the electromagnetic coil must be supplied DC electric power from a battery mounted in an automobile engine compartment, through a wire, although the battery and wire are not illustrated in the drawings of '578 Patent. Therefore, the wire which leads from the electromagnetic coil assembly to the outside of the electromagnetic coil assembly should be considered part of the structure.

One prior art embodiment regarding the above-mentioned structure is illustrated in FIGS. 1 and 2. Referring to FIGS. 1 and 2, electromagnetic coil assembly 100' of an electromagnetic clutch includes annular magnetic housing 110 having a U-shaped cross section, electromagnetic coil 120 contained within annular magnetic housing 110 and annular supporting plate 130 to which annular magnetic housing 110 is firmly fixed by, for example, spot welding. Annular magnetic housing 110 includes inner annular cylindrical portion 111, outer annular cylindrical portion 112 and annular bottom end portion 113 connecting one end of inner and outer annular cylindrical portions 111, 112. Annular supporting plate 130 is firmly secured to the axial end surface of compressor housing (not shown) by a plurality of rivets (not shown). The thickness of inner annular cylindrical portion 111 of housing 110 is designed to be slightly greater than the thickness of outer annular cylindrical portion 112 of housing 110. Hole 114 is formed at a certain region of bottom end portion 113 of annular magnetic housing 110. Spot facing 115 concentric with hole 114 is formed at bottom end portion 113 by using cutting tool 400 as shown in FIG. 4. Bottom surface 115a of spot facing 115 is slightly slanted toward a center thereof. Consequently, annular flange 116 inwardly extending from inner side wall 115b of spot facing 115 is formed at the certain region of bottom end portion 113 of annular magnetic housing 110.

Grommet 140 is made of an elastomeric insulating material, for example, rubber, and penetrates through hole 114. Grommet 140 includes upper cylindrical portion 141, lower cylindrical portion 142 connected to a bottom end of upper cylindrical portion 142 and truncated corn-shaped portion 143 connected to a bottom end of lower cylindrical portion 142. Hole 144 is centrally and axially bored though grommet 140 and annular groove 145 is formed at a boundary between upper cylindrical portion 141 and lower cylindrical portion 142 of grommet 140. A diameter of upper cylindrical portion 141 is designed to be greater than a diameter of lower cylindrical portion 142. Annular upper surface 145b of groove 145 is slightly slanted so as to be along bottom surface 115a of spot facing 115. A diameter of annular bottom surface 145a of groove 145 is designed to be slightly greater than a diameter of hole 114. A diameter of upper cylindrical portion 141 of grommet 140 is designed to be slightly greater than a diameter of inner side wall 115b of spot facing 115. Accordingly, by utilizing elasticity of the rubber member, upper cylindrical portion 141 of grommet 140 is snugly disposed within spot facing 115 and annular groove 115 of grommet 140 is snugly engaged with annular flange 116.

Annular supporting plate 130 includes shallow cup-shaped region 130a defining indent 131 at its upper side and annular region 130b radially extending from a periphery of shallow cup-shaped region 130a. Annular supporting plate 130 is provided with semicircular cut-out portion 131a formed at annular region 130b thereof. Semicircular cut-out portion 131a is aligned with hole 114 to accommodate lower cylindrical portion 142 of grommet 140 therein when bottom end portion 113 of annular magnetic housing 110 is firmly fixed to annular region 130b of annular supporting plate 130. Annular magnetic housing 110 is firmly fixed to annular region 131a of annular supporting plate 130 by spot welding, thereby forming a plurality of spot welding traces 132 as shown in FIG. 1.

Annular flange 116 and semicircular cut-out portion 131a constitute engaging mechanism 200' which can engage with annular groove 145 of grommet 140.

Hole 144 of grommet 140 includes truncated cone-shaped section 144a at its upper side and cylindrical section 144b at its lower side. Truncated cone-shaped section 144a gradually narrows downwardly and is connected to cylindrical section 144b at its bottom end.

Cavity 110a defined by annular magnetic housing 110 and grommet 140 is filled with the heated epoxy resin 150, which is hardened by elapsing time with cooling, so as to fixedly dispose coil 120 therewithin.

As shown in FIG. 1, a pair of tiny identical projections 160 are formed at a bottom end surface of annular supporting plate 130 so as to be received within a pair of tiny identical indents (not shown) formed at the axial end surface of the refrigerant compressor housing to prevent rotational movement of electromagnetic coil assembly 100'.

Wire 170 leading from a bottom end portion of electromagnetic coil 120 snugly penetrates through hole 144 of grommet 140. Terminal end 171 of wire 170 is connected to plug 180 which is connected to a terminal end of another wire (not shown) leading from a control apparatus (not shown) of an automobile air conditioning system.

Accordingly, grommet 140 is used as an insulator, as a plug which can prevent leakage of the heated epoxy resin 150 through hole 114 from the inside of housing 110 and as a holder which can firmly hold wire 170.

By virtue of operation of the control apparatus of the automobile air conditioning system, electromagnetic coil 120 is intermittently activated in response to the automobile air conditioning demand. Therefore, power of the automobile engine is intermittently transmitted to the refrigerant compressor through the electromagnetic clutch in response to the automobile air conditioning demand.

Engaging mechanism 200' is formed as follows. First, referring to FIGS. 3 and 4, hole 114 is formed at bottom end portion 113 of annular magnetic housing 110 by punching out during press working of housing 110. Then, referring to FIGS. 4 and 5, spot facing 115 concentric with hole 114 is formed at bottom end portion 113 of annular magnetic housing 110 by using cutting tool 400. Consequently, annular flange 116 is formed at a bottom end surface of bottom end portion 113 of annular magnetic housing 110 as shown in FIG. 5. Next, referring to FIGS. 1 and 2, semicircular cut-out portion 131a is formed at annular region 130b of annular supporting plate 130 by punching out during press working of plate 130. Finally bottom end portion 113 of housing 110 is firmly fixed to annular region 130b of supporting plate 130 by spot welding with hole 114 aligned with semicircular cut-out portion 131a as shown in FIG. 1. Thus, engaging mechanism 200' is formed at the bottom end surface of bottom end portion 113 of annular magnetic housing 110 as shown in FIG. 2.

As described above, in this prior art embodiment, it is required not only to use the press but also to use cutting tool 400 of FIG. 4 in order to form engaging mechanism 200'. Therefore, a manufacturing process of electromagnetic coil assembly 100' of the electromagnetic clutch is complicated.

SUMMARY OF THE INVENTION

Accordingly, it is an object of the present invention to provide a simple manufacturing process for an electromagnetic coil assembly of an electromagnetic clutch.

An electromagnetic clutch includes an electromagnetic coil assembly comprising an annular magnetic housing having a U-shaped cross section, an annular supporting plate on which a bottom end portion of the annular magnetic housing is firmly attached and a plug element having an annular groove at its outer peripheral surface. An engaging mechanism engages with the annular groove of the plug element. The engaging mechanism includes a first circular hole formed at the bottom end portion of the annular magnetic housing and a concentric second circular hole formed at the annular supporting plate. A diameter of the first circular hole is greater than a diameter of the second circular hole, thereby forming annular projection at a bottom end surface of the bottom end portion of the annular magnetic housing. The first and second circular holes are formed by the press working.

BRIEF DESCRIPTION OF THE DRAWINGS

FIG. 6 illustrates a bottom plan view of an electromagnetic clutch in accordance with one embodiment of the present invention.

FIG. 7 illustrates an enlarged fragmentary vertical sectional view taken on line 7—7 of FIG. 6.

DETAILED DESCRIPTION OF THE PREFERRED EMBODIMENT

Figure 2:
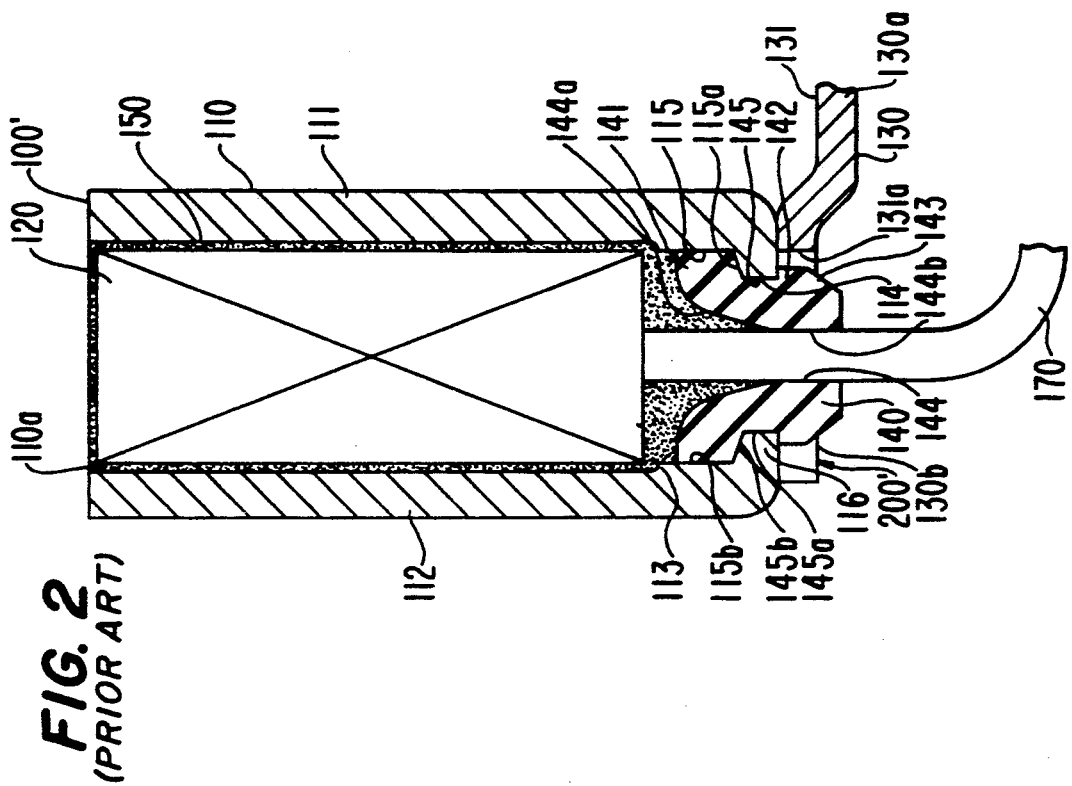
FIG. 2 illustrates an enlarged fragmentary vertical sectional view taken on line 2—2 of FIG. 1.
Figure 1:
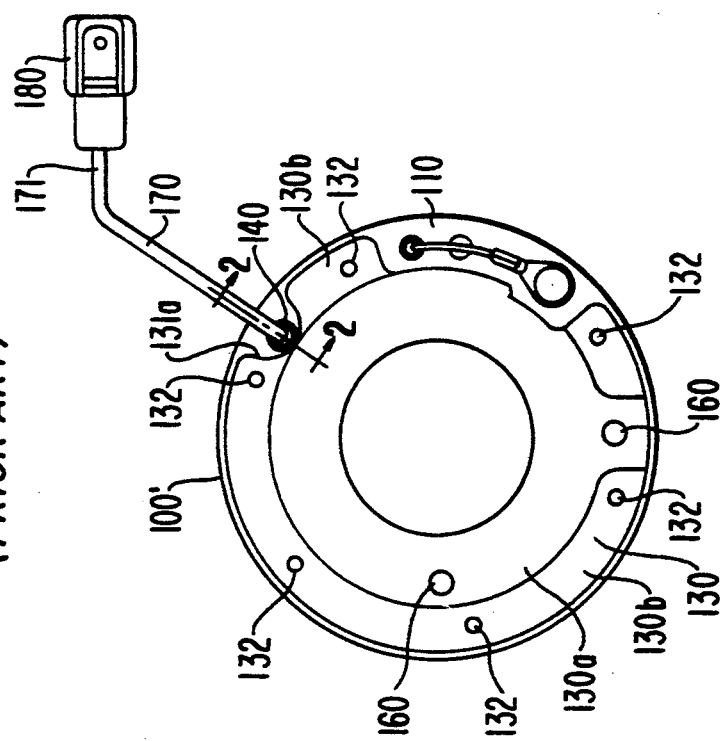
FIG. 1 illustrates a bottom plan view of an electromagnetic coil assembly of an electromagnetic clutch in accordance with one prior art embodiment.

FIGS. 6 and 7 illustrate the structure of an electromagnetic coil assembly of an electromagnetic clutch in accordance with one embodiment of the present invention. In FIGS. 6 and 7 the same numerals are used to denote the corresponding elements shown in FIGS. 1 and 2, thus an explanation thereof is omitted.

Referring to FIGS. 6 and 7, electromagnetic coil assembly 10 of an electromagnetic clutch includes annular magnetic housing 110 having hole 114 formed at bottom end portion 113 thereof and grommet 24 penetrating through hole 114. Grommet 24 is made of an elastomeric insulating material, for example, rubber, and comprises cylindrical portion 241 and truncated cone-shaped portion 242. Hole 144 is centrally and axially bored through grommet 24 and annular groove 243 formed at a boundary between cylindrical portion 241 and truncated cone-shaped portion 242 of grommet 24.

Annular supporting plate 130 is provided with circular hole 133 formed at annular region 130b thereof. Annular magnetic housing 110 is firmly fixed to annular region 130b of annular supporting plate 130 by spot welding with hole 114 concentrically aligned with hole 133. A diameter of hole 133 is designed to be smaller than a diameter of hole 114. Consequently, annular projection 134 projecting from an inner peripheral surface of hole 114 is formed at the bottom end surface of bottom end portion 113 of housing 110. The function of annular projection 134 is similar to the function of engaging mechanism 200' in the prior art embodiment. Therefore, holes 114 and 133 constitute engaging mechanism 200.

A diameter of circular hole 133 is designed to be slightly smaller than a diameter of bottom end surface 243a of groove 243. The width of groove 243 is designed to be slightly smaller than the thickness of annular region 130b of annular supporting plate 130. Furthermore, a diameter of cylindrical portion 241 of grommet 24 is designed to be slightly greater than a diameter of hole 114. Accordingly, by utilizing elasticity of the rubber member, cylindrical portion 241 of grommet 24 is snugly disposed within hole 114 and annular groove 243 of grommet 24 is snugly engaged with annular projection 134.

Figure 3:
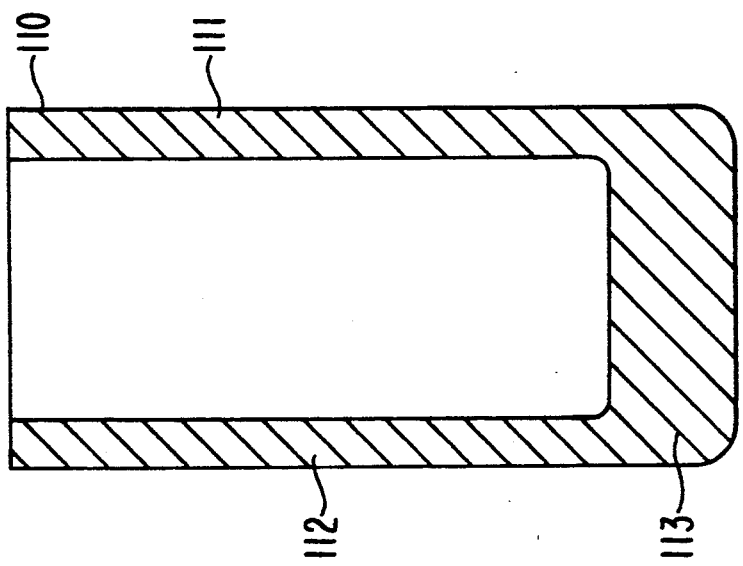
Figure 8:
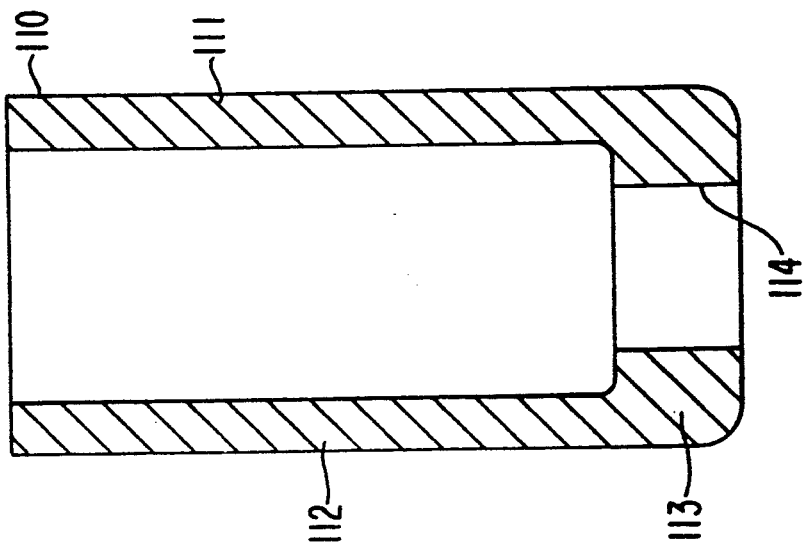
FIGS. 8-10 illustrate the electromagnetic coil assembly in each manufacturing process of the one embodiment of the present invention.
Figure 5:
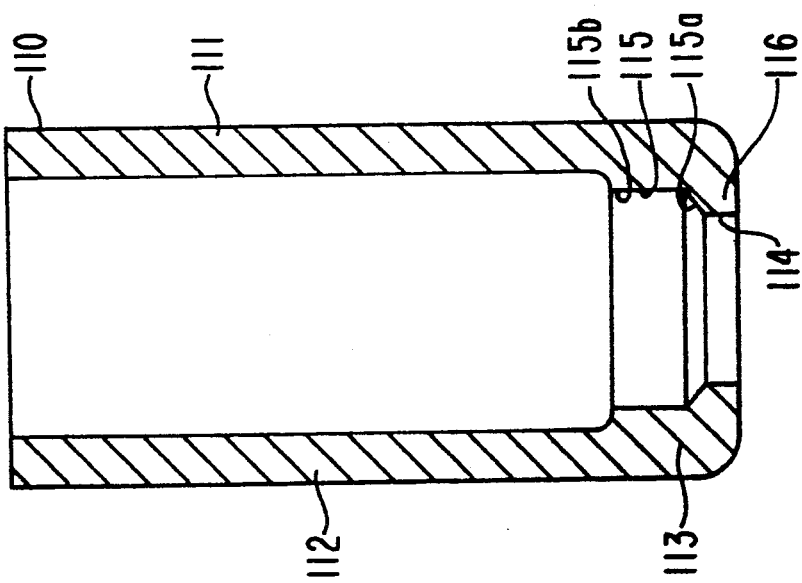

Engaging mechanism 200 is formed as follows. First, referring to FIGS. 3 and 8, hole 114 is formed at bottom end portion 113 of housing 110 by a press working operation such as punching. Then, referring to FIG. 9, hole 133 is formed at annular region 130b of supporting plate 130 by a press working operation such as punching. Finally, bottom end portion 113 of housing 110 is firmly fixed to annular region 130b of supporting plate 130 by spot welding with hole 114 concentrically aligned with hole 133. Consequently, annular projection 134 projecting from the inner peripheral surface of hole 114 and engaging mechanism 200 are formed at the bottom end surface of bottom end portion 113 of housing 110 as shown in FIG. 9.

Figure 10:
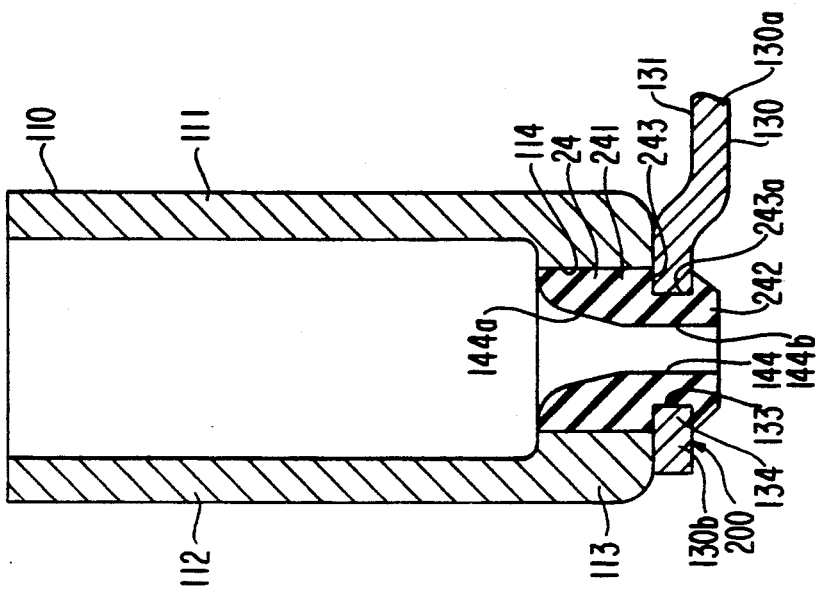
Figure 9:
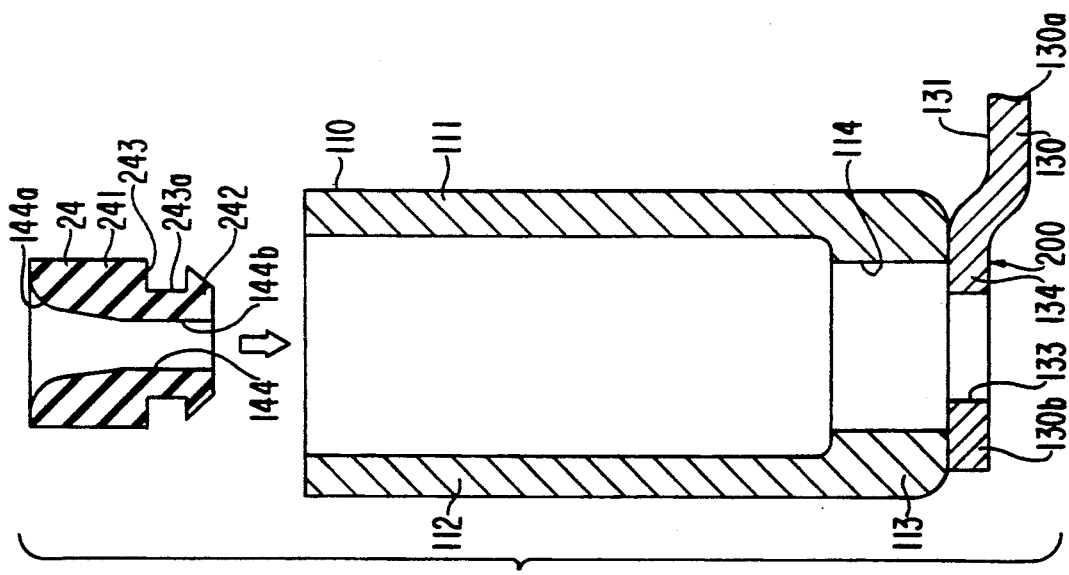

Furthermore, referring to FIGS. 9 and 10, by utilizing elasticity of the rubber member, cylindrical portion 241 of grommet 24 is snugly disposed within hole 114, and annular groove 243 of grommet 24 is snugly engaged with annular projection 134.

Figure 4:
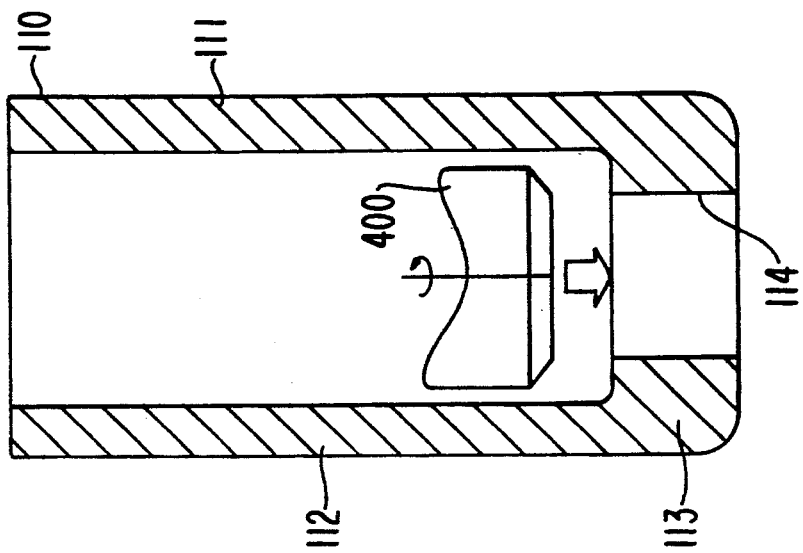
FIGS. 3-5 illustrate the U-shaped annular magnetic housing in each manufacturing process of the prior art embodiment.

As described above, in this preferred embodiment of the present invention, it is not required to use cutting tool 400 as shown in FIG. 4 in order to form engaging mechanism 200, but rather it is only required to use the press to form holes 114 and 133. Therefore, electromagnetic coil assembly 10 of the electromagnetic clutch is manufactured in a simple manufacturing process.

Furthermore, since the diameter of circular hole 133 of supporting plate 130 is designed to be slightly small than the diameter of bottom end surface 243a of groove 243 of grommet 24, the area of cut-out region defining circular hole 133 is sufficiently decreased in comparison with the area of cut-out region defining semicircular cut-out portion 131a of the supporting plate of the prior art embodiment. Therefore, strength of supporting plate 130 is increased in comparison with the supporting plate of the prior art embodiment. In addition, further spot welding can be done at annular region 130b of supporting plate 130 as shown in FIG. 6. Thereby, bottom end portion 113 of housing 110 is further firmly fixed to annular region 130b of supporting plate 130.

I claim:

1. In an electromagnetic clutch including an electromagnetic coil assembly comprising an annular magnetic housing having a U-shaped cross section, a first circular hole formed at said bottom end portion of said annular magnetic housing, an annular supporting plate supporting said annular magnetic housing on which a bottom end portion of said annular magnetic housing is firmly attached, and an elastomeric plug element having an annular groove at its outer surface,
    engaging means engaging said annular groove of said elastomeric plug element,
    said engaging means including a second circular hole, concentric with said first circular hole, formed at said annular supporting plate,
    a diameter of said first circular hole being greater than a diameter of said second circular hole, thereby forming an annular projection at a bottom end surface of said bottom end portion of said annular magnetic housing.

2. In an electromagnetic clutch including an electromagnetic coil assembly comprising an annular magnetic housing having a U-shaped cross section, a first circular hole formed at said bottom end portion of said annular magnetic housing, an annular supporting plate supporting said annular magnetic housing on which a bottom end portion of said annular magnetic housing is firmly attached, and an elastomeric plug element having an annular groove at its outer surface,
    engaging means engaging said annular groove of said elastomeric plug element,
    said engaging means including a second circular hole, concentric with said first circular hole, formed at said annular supporting plate,
    a diameter of said first circular hole being greater than a diameter of said second circular hole, thereby forming an annular projection at a bottom end surface of said bottom end portion of said annular magnetic housing,
    a method of manufacturing said coil assembly comprising the steps of:
    forming said first circular hole by press working, and
    forming said second circular hole by press working.

3. An electromagnetic coil assembly comprising:
    an annular magnetic housing having a U-shaped cross section and a bottom end portion;
    an annular supporting plate supporting said annular magnetic housing and attached to said bottom end portion of said annular magnetic housing;
    a first circular hole having a first diameter, formed at said bottom end portion of said annular magnetic housing;
    a second circular hole, having a second diameter smaller than said first diameter, concentric with said first circular hole formed at said annular supporting plate; and
    an elastomeric plug element having an annular groove at its outer surface, engaging said first and second circular holes.

* * * * *